(12) United States Patent
Kang

(10) Patent No.: US 6,779,963 B2
(45) Date of Patent: Aug. 24, 2004

(54) APPARATUS AND METHOD TO CONTROL FORCE EXERTED ON STEAM TURBINES BY INLET PIPES

(75) Inventor: Suk Jin Kang, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 58 days.

(21) Appl. No.: 10/065,810

(22) Filed: Nov. 21, 2002

(65) Prior Publication Data

US 2004/0101394 A1 May 27, 2004

(51) Int. Cl.[7] .............................................. F01D 25/24
(52) U.S. Cl. ........................ 415/1; 415/200; 415/220
(58) Field of Search ............................ 415/1, 200, 220

(56) References Cited

U.S. PATENT DOCUMENTS

| | | | |
|---|---|---|---|
| 4,550,569 A | * | 11/1985 | Isa et al. ...................... 60/657 |
| 4,899,543 A | | 2/1990 | Romanelli et al. |
| 4,945,727 A | | 8/1990 | Whitehead et al. |
| 5,447,125 A | | 9/1995 | McNally et al. |
| 5,669,977 A | | 9/1997 | Shufflebotham et al. |
| 6,149,742 A | | 11/2000 | Carpenter et al. |
| 6,454,913 B1 | | 9/2002 | Rasmussen et al. |
| 6,637,110 B2 | * | 10/2003 | Jee ........................ 29/890.031 |

* cited by examiner

Primary Examiner—Ninh H. Nguyen
(74) Attorney, Agent, or Firm—Armstrong Teasdale LLP

(57) ABSTRACT

A steam turbine is provided that includes in an exemplary embodiment, a steam inlet pipe coupled to a steam inlet port in a steam turbine housing. At least a portion of the steam inlet pipe is fabricated from at least one of a shape memory alloy having a memorized activated configuration and a negative thermal expansion ceramic having an activated configuration.

19 Claims, 3 Drawing Sheets

APPARATUS AND METHOD TO CONTROL FORCE EXERTED ON STEAM TURBINES BY INLET PIPES

BACKGROUND OF INVENTION

This invention relates generally to steam turbines, and particularly to steam turbine steam inlet and outlet piping that includes portions fabricated from shape memory alloys.

Steam and gas turbines are used, among other purposes, to power electric generators, and gas turbines also are used, among other purposes, to propel aircraft and ships. A steam turbine has a steam path which typically includes, in serial-flow relationship, a steam inlet, a turbine, and a steam outlet. A gas turbine has a gas path which typically includes, in serial-flow relationship, an air intake (or inlet), a compressor, a combustor, a turbine, and a gas outlet (or exhaust nozzle). Compressor and turbine sections include at least one circumferential row of rotating blades. The free ends or tips of the rotating blades are surrounded by a stator casing.

The steam inlet piping is installed at room temperatures when the steam turbine is assembled. During startup and operation, the pipes expand and can exert force and moments on the steam turbine casing. These forces can distort the casing of the steam turbine which can cause rubbing of the internal moving components of the turbine.

SUMMARY OF INVENTION

In one aspect, a steam turbine is provided that includes a steam inlet pipe coupled to a steam inlet port in a steam turbine housing. At least a portion of the steam inlet pipe is fabricated from at least one of a shape memory alloy having a memorized activated configuration and a negative thermal expansion ceramic having an activated configuration.

In another aspect, a method of controlling forces exerted on a steam turbine by a steam inlet pipe is provided. The steam turbine includes a steam inlet pipe coupled to a steam inlet port in a steam turbine housing. The method includes fabricating at least a portion of the steam inlet pipe from at least one of a shape memory alloy having a memorized activated configuration and a negative thermal expansion ceramic having an activated configuration, installing the steam inlet pipe with the at least a portion of the steam inlet pipe in an initial configuration at a first temperature, and heating the at least a portion of the steam inlet pipe with steam flowing into the steam turbine to a second temperature which reconfigures the at least a portion of the steam inlet pipe to the activated configuration.

DETAILED DESCRIPTION

A steam turbine that includes a steam input line having at least a portion of the input line fabricated from a shape memory alloy having a memorized activated configuration and/or a negative thermal expansion ceramic having an activated configuration is described in detail below. The shape memory alloy and/or the negative thermal expansion ceramic is used to control the steam input line pipe expansion/contraction during the steam turbine operation. A shape memory alloy, for example NiTi, can be formed into any desired shape. When heat is applied to activate the shape memory alloy, the material reconfigures to a pre-programmed shape. Specifically, when the steam pipe is heated, the shape memory alloy reconfigures to a shape that compensates for the expansion of the remainder of the steam pipe to prevent steam pipe deformation which reduces the stress forces that are transmitted to the steam turbine shell.

Figure 1:
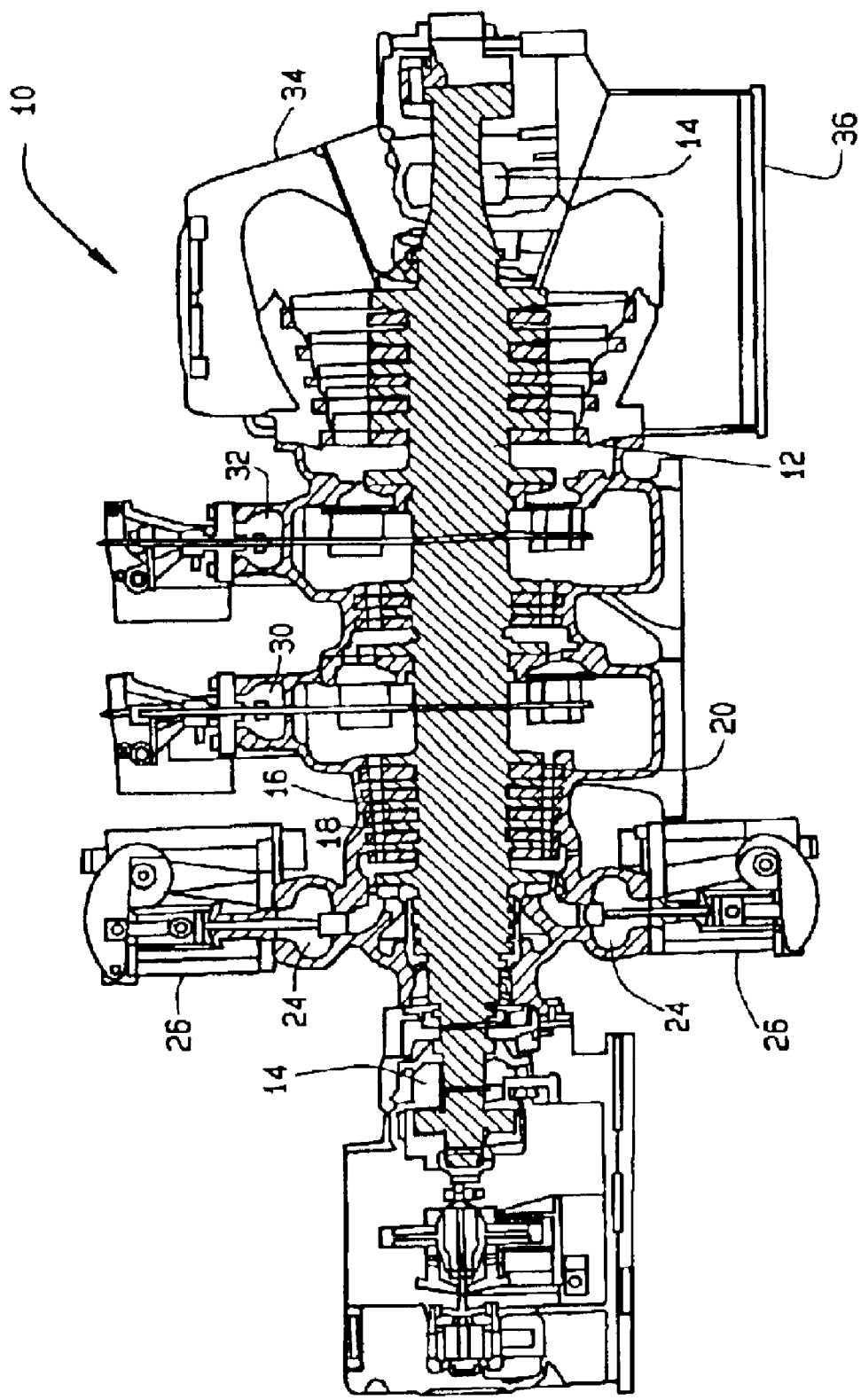
FIG. 1 is sectional schematic view of a steam turbine.

Referring to the drawings, FIG. 1 is a sectional schematic view of a steam turbine 10. Steam turbine 10 includes a shaft 12 passing through turbine 10 and supported at each end by bearing supports 14. A plurality of turbine blade stages 16 are connected to shaft 12. Between turbine blade stages 16 there is positioned a plurality of nonrotating turbine nozzles 18. Turbine blades 16 are connected to turbine shaft 12 while turbine nozzles 18 are connected to support members or nozzle diaphragms 20 attached to a housing or shell 22 surrounding turbine blades 16 and nozzles 18. Steam inlet ports 24 connect to a source of high temperature steam by steam input line 28 (shown in FIG. 2) and direct the steam into turbine 10. Main steam control valves 26 control the flow of steam into turbine 10. Steam is directed through nozzles 18 to impact blades 16 causing blades 16 to rotate along with turbine shaft 12. Some of the steam is admitted into extraction chambers 30 and 32 and a predetermined amount of steam is intentionally piped off to various feedwater heaters (not shown). After the remaining steam passes through all of the turbine blades, it exits through steam exhaust casing 34 and exhaust outlet 36 and is directed back to a condenser (not shown) and then to a reheater and/or boiler (not shown) to be reconverted into steam.

Figure 2:
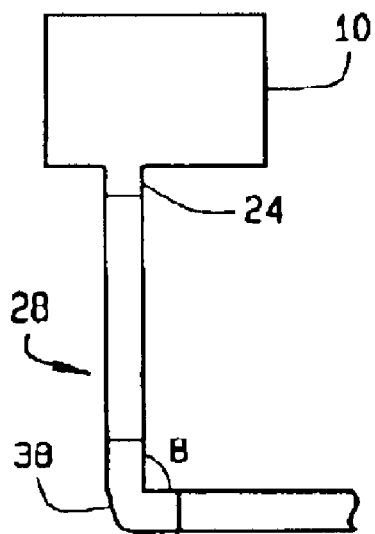
FIG. 2 is a schematic representation of the steam turbine shown in FIG. 1 with a steam input line.

FIG. 2 is a schematic representation of steam turbine 10 with steam input line or pipe 28 connected to steam inlet port 24. Steam input pipe 28 includes a plurality of pipe elbows 38 (one shown). During start-up, as steam passes through steam pipe 28, steam pipe 28 and pipe elbow 38 expand causing a deformation of steam pipe 28 which imparts stress forces on turbine shell 22. These stress forces on turbine shell 22 can cause a deformation of shell 22 which can exceed the tolerances between the moving parts inside shell 22 causing rubbing of turbine blades 16 with shell 22.

Figure 3:
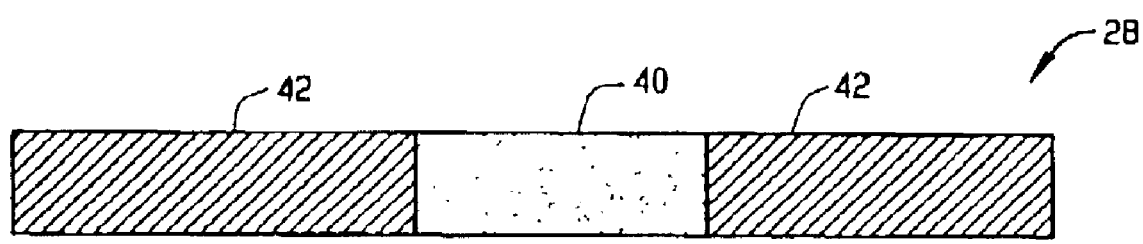
FIG. 3 is a schematic representation of the steam input line shown in FIG. 2 in a deactivated state.
Figure 4:
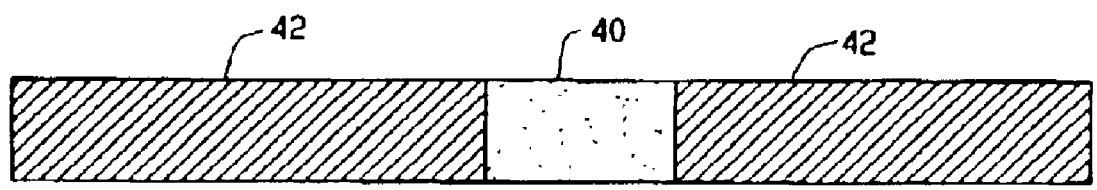
FIG. 4 is a schematic representation of the steam input line shown in FIG. 2 in an activated state.

Referring also to FIGS. 3 and 4, in an exemplary embodiment of the present invention, steam input line 28 includes a portion 40 fabricated from a shape memory alloy and/or a negative thermal expansion ceramic. The remaining portions 42 are fabricated from any other suitable material such as, for example, steel, stainless steel, and cast iron.

Various metallic materials are capable of exhibiting shape-memory characteristics. These shape-memory capabilities occur as the result of the metallic alloy undergoing a reversible crystalline phase transformation from one crystalline state to another crystalline state with a change in temperature and/or external stress. In particular, alloys of nickel and titanium exhibit these properties of being able to undergo energetic crystalline phase changes at ambient temperatures, thus giving them a shape-memory. These shape-memory alloy materials, if plastically deformed while cool, will revert to their original, undeformed shape when warmed. These energetic phase transformation properties render articles made from these alloys highly useful in a variety of applications. An article made of an alloy having shape-memory properties can be deformed at a low temperature from its original configuration, but the article "remembers" its original shape, and returns to that shape when heated.

For example, in nickel-titanium alloys possessing shape-memory characteristics, the alloy undergoes a reversible transformation from an austenitic state to a martensitic state with a change in temperature. This transformation is often referred to as a thermoelastic martensitic transformation. The reversible transformation of the NiTi alloy between the austenite to the martensite phases occurs over two different temperature ranges which are characteristic of the specific alloy. As the alloy cools, it reaches a temperature $M_s$ at which the martensite phase starts to form, and finishes the transformation at a still lower temperature $M_f$. Upon reheating, it reaches a temperature $A_s$ at which austenite begins to reform and then a temperature $A_f$ at which the change back to austenite is complete. In the martensitic state, the alloy can be easily deformed. When sufficient heat is applied to the deformed alloy, it reverts back to the austenitic state, and returns to its original configuration. Suitable shape memory alloys include, but are not limited to, NiTi, NiTiCu, CuZnAl, CuAlNi, NiTiFe, CuAlNiTiMn, TiNiPd, TiNiPt, NiTiPd, and TiNiHf.

Also, some ceramic materials and composite materials exhibit negative thermal expansion characteristics. Particularly, these negative thermal expansion materials contract when heated. When portion 40 of steam line 28 is fabricated from a negative thermal material, portion 40 of steam line 40 contracts when heated by flowing steam while portions 42 of steam line expand. In the exemplary embodiment, the size of portion 40 and the particular negative thermal material is chosen so that the contraction of portion 40 is approximately equal to the expansion of portions 42 of steam line 28, thus minimizing the stress forces imparted on steam turbine 10. FIG. 3 shows a representation of portion 40 and portions 42 of a "cool" steam line 28 in an initial configuration. FIG. 4 shows a representation of portion 40 and portions 42 of a "hot" steam line 28 with steam flowing through steam line 28. FIG. 4 shows the expansion of length of portions 42 and the contraction of portion 40. Suitable negative thermal expansion ceramics include, but are not limited to $ZrW_2O_8$ and $ZrP_2O_7$.

Further, portion 40 of steam line 28 can be fabricated from a shape memory material that has a memorized activated configuration that has a length that is less than a deactivated configuration length. Particularly, as steam line 28 is heated by flowing steam, the shape memory material that forms portion 40 changes from its non-activated configuration to its activated configuration which has a length that is less than the non-activated configuration while portions 42 of steam line expand. In the exemplary embodiment, the difference in length between the non-activated configuration and the activated configuration is selected to be approximately equal to the expansion of portions 42 of steam line 28, thus minimizing the stress forces imparted on steam turbine 10.

Figure 5:
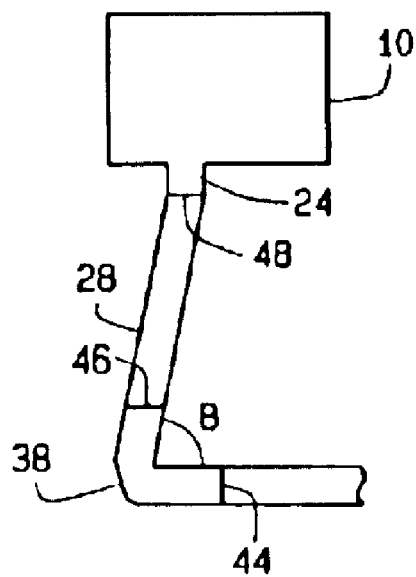
FIG. 5 is a schematic representation of the steam turbine and steam input line shown in FIG. 2 in a heated state.

FIG. 5 is a schematic representation of steam turbine 10 and steam line 28 heated by steam flowing through steam line 28. Because of an increase in temperature caused by the flowing steam, steam line 28 expands and stress forces deform pipe elbow 38. In this heated state, there are high stresses on pipe elbow joints 44 and 46, and on steam line to inlet port joint 48. To alleviate the stresses in steam line 28, steam pipe elbow 38 is fabricated from a shape memory material with a memorized activated configuration of a "deformed" elbow as shown in FIG. 5. When steam pipe elbow 38 is heated by the flow of steam it reconfigures to the memorized activated "deformed" configuration which eliminates the stresses in elbow joints 44 and 46 and reduces the stresses in joint 48 between steam line 28 and steam inlet port 24 in steam turbine casing 22. The "deformed" configuration of pipe elbow 38 has an elbow angle B that is different from an elbow angle B of the non-activated configuration of elbow 38 (shown in FIG. 2). The amount of deformation or change of elbow angle B between the non-activated configuration and the activated "deformed" configuration is selected to reduce the stress on turbine casing 22 caused by the expansion of steam pipe 28 when heated by the flow of steam.

While the invention has been described in terms of various specific embodiments, those skilled in the art will recognize that the invention can be practiced with modification within the spirit and scope of the claims.

I claim:

1. A steam turbine comprising a steam inlet pipe coupled to a steam inlet port in a steam turbine housing, at least a portion of said steam inlet pipe fabricated from at least one of a shape memory alloy having a memorized activated configuration, and a negative thermal expansion ceramic having an activated configuration.

2. A steam turbine in accordance with claim 1 wherein said shape memory alloy is transformable from a martensitic state to an austenitic state, said portion of said steam inlet pipe restorable from an initial configuration to said memorized configuration at a temperature at which said shape memory alloy transforms to said austenitic state.

3. A steam turbine in accordance with claim 1 wherein said portion of said steam inlet pipe fabricated from at least one of a shape memory alloy and a negative thermal expansion ceramic comprises a straight section of said steam inlet pipe.

4. A steam turbine in accordance with claim 3 wherein said straight section comprises an initial configuration having a first length at a first temperature and an activated configuration having a second length at a second temperature, said first length greater than said second length and said first temperature less than said second temperature.

5. A steam turbine in accordance with claim 4 wherein a difference between said first length and said second length of said straight section approximately equals an increase in length of the remainder of said steam inlet pipe due to an increase in temperature of said steam inlet pipe.

6. A steam turbine in accordance with claim 1 wherein said portion of said steam inlet pipe fabricated from at least one of a shape memory alloy and a negative thermal expansion ceramic comprises an elbow section of said steam inlet pipe.

7. A steam turbine in accordance with claim 6 wherein said elbow section is fabricated from a shape memory alloy and comprises an initial configuration having an initial elbow angle at a first temperature and a memorized configuration having a memorized activated elbow angle at a second temperature, said first temperature less than said second temperature, said first temperature less than a temperature at which said shape memory alloy transforms to an austenitic state, and said second temperature equal to or greater than a temperature at which said shape memory alloy transforms to said austenitic state, said memorized activated elbow angle different from said initial elbow angle, said memorized activated elbow angle selected to reduce stress on said turbine housing caused by thermal expansion of said steam inlet pipe.

8. A steam turbine in accordance with claim 1 wherein said shape memory alloy comprises an alloy of nickel and titanium or an alloy of copper and aluminum.

9. A steam turbine in accordance with claim 8 wherein said shape memory alloy comprises at least one of NiTi, NiTiCu, CuZnAl, CuAlNi, NiTiFe, CuAlNiTiMn, TiNiPd, TiNiPt, NiTiPd, and TiNiHf.

10. A steam turbine in accordance with claim 1 wherein said negative thermal expansion ceramic comprises at least one of $ZrW_2O_8$ and $ZrP_2O_7$.

11. A method of controlling forces exerted on a steam turbine by a steam inlet pipe, the steam turbine comprising a steam inlet pipe coupled to a steam inlet port in a steam turbine housing, said method comprising:

fabricating at least a portion of the steam inlet pipe from at least one of a shape memory alloy having a memorized activated configuration, and a negative thermal expansion ceramic having an activated configuration;

installing the steam inlet pipe with the at least a portion of the steam inlet pipe in an initial configuration at a first temperature; and heating the at least a portion of the steam inlet pipe with steam flowing into the steam turbine to a second temperature which reconfigures the at least a portion of the steam inlet pipe to the activated configuration.

12. A method in accordance with claim 11 wherein installing the steam inlet pipe comprises installing the steam inlet pipe with the portion of the steam inlet pipe fabricated from at least one of a shape memory alloy and a negative thermal expansion ceramic comprising a straight section of the steam inlet pipe.

13. A method in accordance with claim 12 wherein the straight section comprises an initial configuration having a first length at a first temperature and an activated configuration having a second length at a second temperature, the first length greater than the second length and the first temperature less than the second temperature.

14. A method in accordance with claim 13 wherein a difference between the first length and the second length of the straight section approximately equals an increase in length of the remainder of the steam inlet pipe due to an increase in temperature of the steam inlet pipe.

15. A method in accordance with claim 11 wherein the portion of the steam inlet pipe fabricated from at least one of a shape memory alloy and a negative thermal expansion ceramic comprises an elbow section of the inlet pipe.

16. A method in accordance with claim 15 wherein the elbow section is fabricated from a shape memory alloy and comprises an initial configuration having an initial elbow angle at a first temperature and a memorized configuration having a memorized activated elbow angle at a second temperature, the first temperature less than the second temperature, the first temperature less than a temperature at which the shape memory alloy transforms to an austenitic state, and the second temperature is equal to or greater than a temperature at which the shape memory alloy transforms to the austenitic state, the memorized activated elbow angle different from the initial elbow angle, the memorized activated elbow angle selected to reduce stress on the turbine housing caused by thermal expansion of the steam inlet pipe.

17. A method in accordance with claim 11 wherein said shape memory alloy comprises an alloy of nickel and titanium or an alloy of copper and aluminum.

18. A method in accordance with claim 17 wherein the shape memory alloy comprises at least one of NiTi, NiTiCu, CuZnAl, CuAlNi, NiTiFe, CuAlNiTiMn, TiNiPd, TiNiPt, NiTiPd, and TiNiHf.

19. A method in accordance with claim 11 wherein the negative thermal expansion ceramic comprises at least one of $ZrW_2O_8$ and $ZrP_2O_7$.

* * * * *